United States Patent
Lee et al.

(10) Patent No.: US 8,198,557 B2
(45) Date of Patent: Jun. 12, 2012

(54) APPARATUS FOR PREVENTING WITHDRAWING OR INSERTING OF CARRIAGE IN CIRCUIT BREAKER

(75) Inventors: Jae Yong Lee, Chungcheongbuk-Do (KR); Hyun Jae Kim, Chungcheongbuk-Do (KR)

(73) Assignee: LS Industrial Systems Co., Ltd., Gyeonggi-Do (KR)

( * ) Notice: Subject to any disclaimer, the term of this patent is extended or adjusted under 35 U.S.C. 154(b) by 223 days.

(21) Appl. No.: 12/718,121

(22) Filed: Mar. 5, 2010

(65) Prior Publication Data

US 2010/0230256 A1   Sep. 16, 2010

(30) Foreign Application Priority Data

Mar. 11, 2009   (KR) ................. 10-2009-0020904

(51) Int. Cl.
*H01H 9/20* (2006.01)
(52) U.S. Cl. ............... 200/50.21; 200/50.24; 200/50.25; 361/605
(58) Field of Classification Search .... 200/50.21–50.25; 361/605–610, 615
See application file for complete search history.

(56) References Cited

U.S. PATENT DOCUMENTS

| | | | | |
|---|---|---|---|---|
| 5,337,210 A | * | 8/1994 | Ishikawa et al. | 361/608 |
| 6,066,814 A | * | 5/2000 | Smith et al. | 200/50.24 |
| 6,545,234 B1 | * | 4/2003 | Trivette et al. | 200/50.21 |
| 6,884,949 B2 | * | 4/2005 | Yoon | 200/50.26 |
| 7,078,634 B2 | * | 7/2006 | Anger et al. | 200/50.21 |
| 7,821,775 B2 | * | 10/2010 | Narayanasamy et al. | 361/609 |
| 2004/0212943 A1 | | 10/2004 | Yoon | |
| 2008/0174940 A1 | * | 7/2008 | Lyu et al. | 361/609 |

FOREIGN PATENT DOCUMENTS

| | | |
|---|---|---|
| JP | 49-141317 | 12/1974 |
| JP | 50-33229 | 4/1975 |
| JP | 55-24095 | 2/1980 |
| JP | 57-46602 | 3/1982 |
| JP | 63-103608 | 5/1988 |
| JP | 63-124007 | 8/1988 |
| JP | 5-029213 | 4/1993 |
| JP | 5-029214 | 4/1993 |
| JP | 2008-104345 | 5/2008 |
| KR | 0505052 | 8/2005 |

OTHER PUBLICATIONS

Korea Office action, mail date is Feb. 25, 2011.
Japan Office action, mail date is Feb. 28, 2012.

* cited by examiner

*Primary Examiner* — Michael Friedhofer
(74) *Attorney, Agent, or Firm* — Greenblum & Bernstein P.L.C.

(57) ABSTRACT

An apparatus for preventing withdrawing and insertion of a carriage of a circuit breaker is disclosed. When a circuit breaker main body is inserted, an interlocking unit operates by interworking with the carriage withdrawing and inserting preventing apparatus, and while the circuit breaker is being closed, a withdrawal and insertion handle prevents a lead screw from being rotated by the interlocking unit. Thus, when the circuit breaker performs a closing operation, unnecessary withdrawing and inserting operation of the carriage is basically prevented to thus prevent various safety accidents, a contact resistance, a temperature increase, and damage to a device resulting from a breakdown.

14 Claims, 8 Drawing Sheets

APPARATUS FOR PREVENTING WITHDRAWING OR INSERTING OF CARRIAGE IN CIRCUIT BREAKER

The present disclosure relates to subject matter contained in priority Korean Application No. 10-2009-0020904, filed on Mar. 11, 2009, the disclosure of which is herein expressly incorporated by reference in its entirety.

BACKGROUND OF THE INVENTION

1. Field of the Invention

The present invention relates to a circuit breaker field and, more particularly, to an apparatus for preventing withdrawing or inserting of a carriage in a circuit breaker capable of preventing a breaker body from being inserted into or withdrawn from a cradle while a circuit breaker is being input by interworking with an opening and closing operation of the circuit breaker, to thereby secure stability of the circuit breaker and prevent damage to the circuit breaker.

2. Description of the Related Art

In general, a vacuum circuit breaker (referred to as a 'circuit breaker', hereinafter) is a protection device for automatically breaking power quickly when there is a fault in a power system as well as transmitting and receiving, switching and stopping power by using a vacuum interrupter as an arc extinguishing medium. Namely, the circuit breaker rapidly spreads and extinguishes an arc product, which is generated during an opening and closing in case of a normal load and when an accident current is broken, to quickly separate a circuit to thereby protect the circuit and the device.

The circuit breaker generally includes a cradle, a breaker main body, a carriage, and auxiliary devices. Here, the carriage includes various mechanic devices integrally coupled with the breaker main body and selectively move the breaker main body to the cradle.

In order to operate the circuit breaker, the breaker main body must be electrically connected with the cradle. Namely, the carriage must be completely moved to the cradle and respective contact points of the breaker main body integrally coupled with a front side of the carriage must be completely bound with the cradle to perform a closing operation. However, if the carriage is inserted and withdrawn while the circuit breaker is being closed, a serious safety accident would occur or the device would be damaged, so an apparatus for preventing inserting and withdrawing of carriage is required to prevent the carriage from being inserted or withdrawn while the circuit breaker is being closed.

FIGS. 1 to 4 illustrate an apparatus for preventing inserting and withdrawing of a carriage of the related art circuit breaker.

As shown in FIGS. 1 to 4, the related art circuit breaker includes a cradle 1, a breaker main body 2, a carriage 3 and auxiliary devices.

A lead screw 32 for adding a rotational force to enable the carriage to move in a forward and backward direction is installed within a casing 31, and a nut 33 is threaded with the lead screw in order to provide a moving force to the carriage upon receiving the rotational force of the lead screw 32. Namely, in the related art withdrawing and inserting preventing apparatus, the rotation of the nut 33 is controlled (regulated or managed) in order to prevent the carriage 3 from being unnecessarily inserted or withdrawn during a closing operation.

The withdrawing and inserting preventing apparatus includes a fixed frame 34 installed near the nut 33, clamping members 35 installed at both sides of the nut 33, a horizontal moving plate 36 for moving the clamping members 35 up and down in a state of being in contact with the clamping member 35, and a horizontal moving plate manipulation unit 37 coupled with one side of the horizontal moving plate 36 and providing a moving force to allow the horizontal moving plate 36 to be horizontally moved selectively.

A roller 38 is installed at one end of the clamping member 35 and a stopping piece 39 is integrally formed at the other end of the clamping member 35. The stopping piece 39 is selectively inserted into a stopping recess 33a formed on the nut 33 to control the rotational force of the lead screw 32.

The horizontal moving plate 36 selectively inserts or releases a roller 38 of the clamping member 35 into or from a sliding recess 36a formed at the horizontal moving plate 36 by means of the horizontal moving plate manipulation unit 37, to thus allow the stopping piece 39 of the clamping member 35 to be clamped to a stopping recess 33a of the nut 33 or released therefrom.

Here, the horizontal moving plate manipulation unit 37 includes a first link member 41 having one end directly hinge-coupled to the horizontal moving plate 36, a second link member 42 having one end hinge-coupled to the other end of the first link member 41 and the other end hinge-coupled to the casing 31, a manipulation pin 43 installed to be vertically moved according to a pressing manipulation in a state of being hinge-coupled to an intermediate portion of the second link member, a guide frame 44 for guiding a vertical movement in a state that the manipulation pin 43 is inserted therein, and a coil spring 45 installed between the manipulation pin 43 and the guide frame 44.

In the horizontal moving plate manipulation unit 37, the manipulation pin 43 is protruded upwardly usually by virtue of an elastic force of the coil spring 45 as shown in FIG. 3. Thus, the second link member 42 hinge-coupled therewith is also positioned at an upper side, and because the second link member 42 is hinge-coupled with the first link member 41, the horizontal moving plate 36 is moved at the right side on the drawing by the first link member 41. In this case, as shown in FIG. 4, the roller 38 of the clamping members 35 installed at both sides of the nut 33 is in a state of being deeply inserted in the sliding recess 36a of the horizontal moving plate 36, and accordingly, the stopping piece 39 of the clamping member 35 is inserted in the stopping recess 33a of the nut 33, preventing a rotation of the nut 33. In this state, because the nut 33 is fixed, the carriage 3 can be movable as the lead screw 33 is rotated in one direction.

Meanwhile, when the circuit breaker is in a state of completely closed in the cradle 1 (or while being closed), the circuit breaker must be fixed such that it cannot be withdrawn or inserted. In this case, a rotating piece 46 installed at an upper side of the manipulation pin 43 is rotated clockwise on the drawing, pressing the manipulation pin 43, and in a state that the manipulation pin 43 is moved downwardly, the first and second link members 41 and 42 coupled with the manipulation pin 43 are unfolded in a straight line, pushing the horizontal moving plate 36 to the left side on the drawing.

Then, the roller 38 of the clamping member 35 inserted in the sliding recess 36a of the horizontal moving plate is pushed out in a forward/backward direction along the sliding recess 36a, and the clamping member 35 is released from the stopping recess 33a of the nut 33. Accordingly, the nut 33 is rotated together with the lead screw 32, preventing the carriage 3 from moving. IN this case, the circuit breaker cannot be withdrawn or inserted by a rotational force of the lead screw 32, whereby the circuit breaker can be prevented from being withdrawn or inserted while being closed.

However, the related art apparatus for preventing withdrawing or inserting of the circuit breaker has the following problem. That is, a severe frictional contact is generated from respective components including the manipulation pin and the link member as the operation of clamping the nut is repeated, the respective components are deformed or damaged during the operation. This results in a defective operation of the apparatus for preventing withdrawing and inserting to allow the carriage to be withdrawn or inserted while the circuit breaker is being closed, causing severe damage to the device and a safety accident.

SUMMARY OF THE INVENTION

Therefore, in order to address the above matters, the various features described herein have been conceived.

An aspect of the present invention provides an apparatus for preventing withdrawing and inserting of a carriage of a circuit breaker capable of allowing an operator not to rotate a lead screw while the circuit breaker is being closed, thus preventing a safety accident, improving stability of a device, and preventing damage to the device.

According to an aspect of the present invention, there is provided an apparatus for preventing withdrawing and inserting of a carriage of a circuit breaker, including: a first guiding member having both ends coupled with a girder part, a fixed body, and a carriage main body part, a moving body to which a circuit breaker main body is coupled, respectively, and allowing the distance between the girder part and the carriage main body part to be varied according to its rotational direction; a second guiding member provided at the girder part and selectively limiting the rotational movement of the first guiding member according to whether or not an external force additionally applied from the exterior; and a constraining unit configured to constrain a movement of the second guiding member although an external force is additionally applied to the second guiding member while a closing operation is performed at the circuit breaker main body, to thereby prevent the circuit breaker main body from being withdrawn from a cradle accommodating the circuit breaker main body.

Here, the circuit breaker main body may include an interlocking unit for limiting the closing operation of circuit breaker, and the constraining unit may interwork with the interlocking unit to limit a movement of the second guiding member during the closing operation of the circuit breaker. Meanwhile, the constraining unit operated by the second guiding member operates the interlocking unit to limit the closing operation of the circuit breaker until when the circuit breaker main body is electrically connected with the cradle.

According to another aspect of the present invention, there is provided an apparatus for preventing withdrawing and inserting of a carriage of a circuit breaker, including: a lead screw having both ends rotatably coupled with a girder part, a fixed body, and a carriage main body part, a moving body to which a circuit breaker main body is coupled, respectively, and an intermediate part between the both ends being threaded with the circuit breaker main body; a block assembly coupled to a lead screw at the girder part side and moving in a lengthwise direction of the lead screw by a withdrawal and insertion handle applying an additional external force from the exterior; a push racking plate disposed to be parallel to the lead screw and installed to be movable in a lengthwise direction of the lead screw with respect to the carriage main body part; and a racking interlock pin installed at the carriage main body part such that it is movable in a direction perpendicular to a direction in which the push racking plate is moved, and coupled with the carriage main body part such that an ascending and descending movement is limited by an interlocking unit that limits a closing operation of the circuit breaker.

Here, a rotation prevention protrusion having an angular outer circumferential surface may be formed at one end of the lead screw, and a rotation prevention hole having an angular inner circumferential surface may be formed at the block assembly such that it is selectively engaged to be coupled with the rotation prevention protrusion.

The push racking plate may include a rail face formed to be parallel in a lengthwise direction of the lead screw to allow the racking interlock pin to slide thereon, and a recess may be formed at a middle portion of the rail face in the lengthwise direction to allow the racking interlock pin to be inserted therein to generate a height difference.

The push racking plate may include: a first push racking plate and a second push racking plate slidably coupled with the first push racking plate. The first push racking plate may be fixed to the block assembly, and the second push racking plate may be fixed to the girder part. The recess provided on the first push racking plate may have a slope face allowing the racking interlock pin to slide thereon.

The racking interlock pin includes: a pin unit coupled to slid on the push racking plate; and a bracket unit integrally coupled with the pin unit to push up an interlock bar to allow the interlocking unit to prevent a closing operation of the interlocking unit, constrained by an opening and closing side interlock lever operating as the closing operation is prevented by the interlocking unit, and having a flat shape.

The racking interlock pin is coupled at a racking interlock supporter coupled with the carriage main body part such that the pin unit slides in a movement direction of the interlock bar.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 10 and 11 illustrate a withdrawal and insertion available state of the circuit breaker in the withdrawing and inserting preventing apparatus in FIG. 7, wherein FIG. 10 is a perspective view showing a major part of the circuit breaker viewed from a front side; and FIG. 11 is a schematic view showing the process of lifting an interlock bar as a lead screw is released with respect to a block assembly; and FIGS. 12 and 13 illustrate a withdrawal and insertion preventing state of the circuit breaker in the withdrawing and inserting preventing apparatus in FIG. 7, wherein FIG. 12 is a perspective view showing a major part of the circuit breaker viewed from a front side; and FIG. 13 is a schematic view showing the process of constraining the lead screw with respect to the block assembly as a racking interlock pin is constrained by an opening and closing shaft interlock lever.

DETAILED DESCRIPTION OF THE INVENTION

The apparatus for preventing withdrawing and inserting of a carriage of a circuit breaker according to exemplary embodiments of the present invention will now be described in detail with reference to the accompanying drawings.

Figure 1:
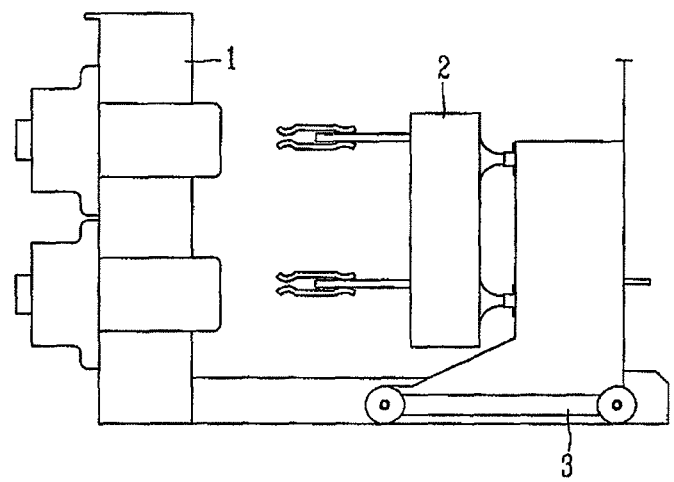
FIG. 1 is a side view simply showing the related art circuit breaker.
Figure 2:
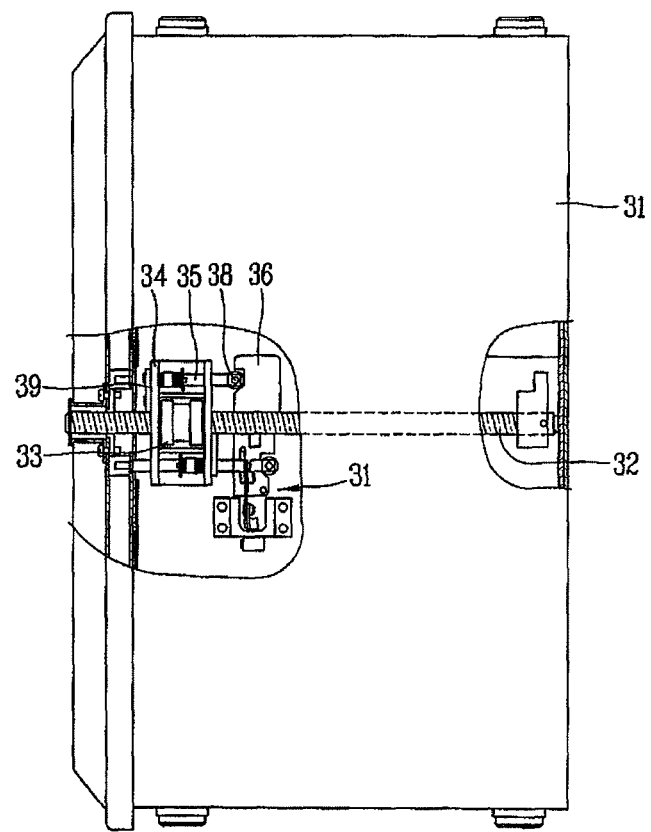
FIG. 2 is a plan view of a major part shown by partially cutting a carriage of the circuit breaker illustrated in FIG. 1.
Figure 3:
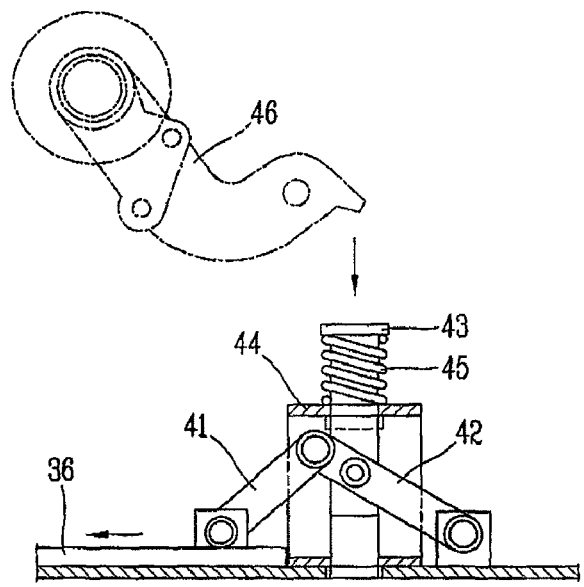
FIG. 3 is a view schematically showing a horizontal moving plate manipulation unit of a carriage withdrawing and inserting preventing apparatus of the circuit breaker illustrated in FIG. 1.
Figure 4:
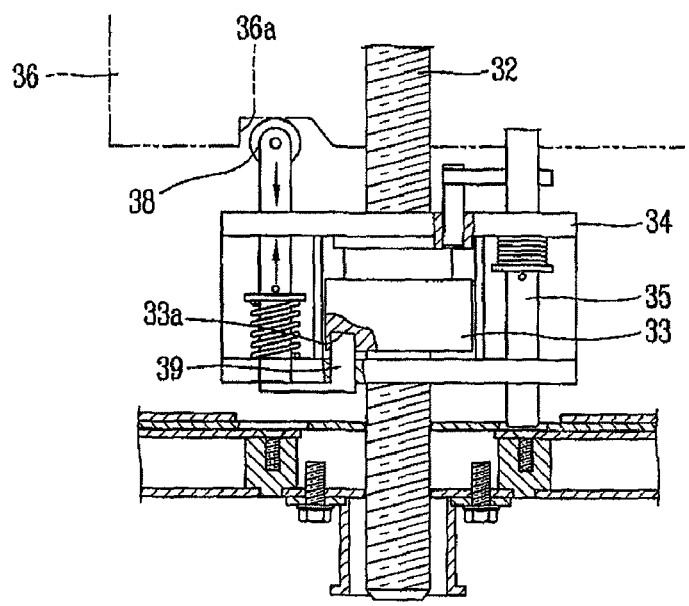
FIG. 4 is a schematic enlarged view of a lead screw and a clamping member illustrated in FIG. 2.
Figure 5:
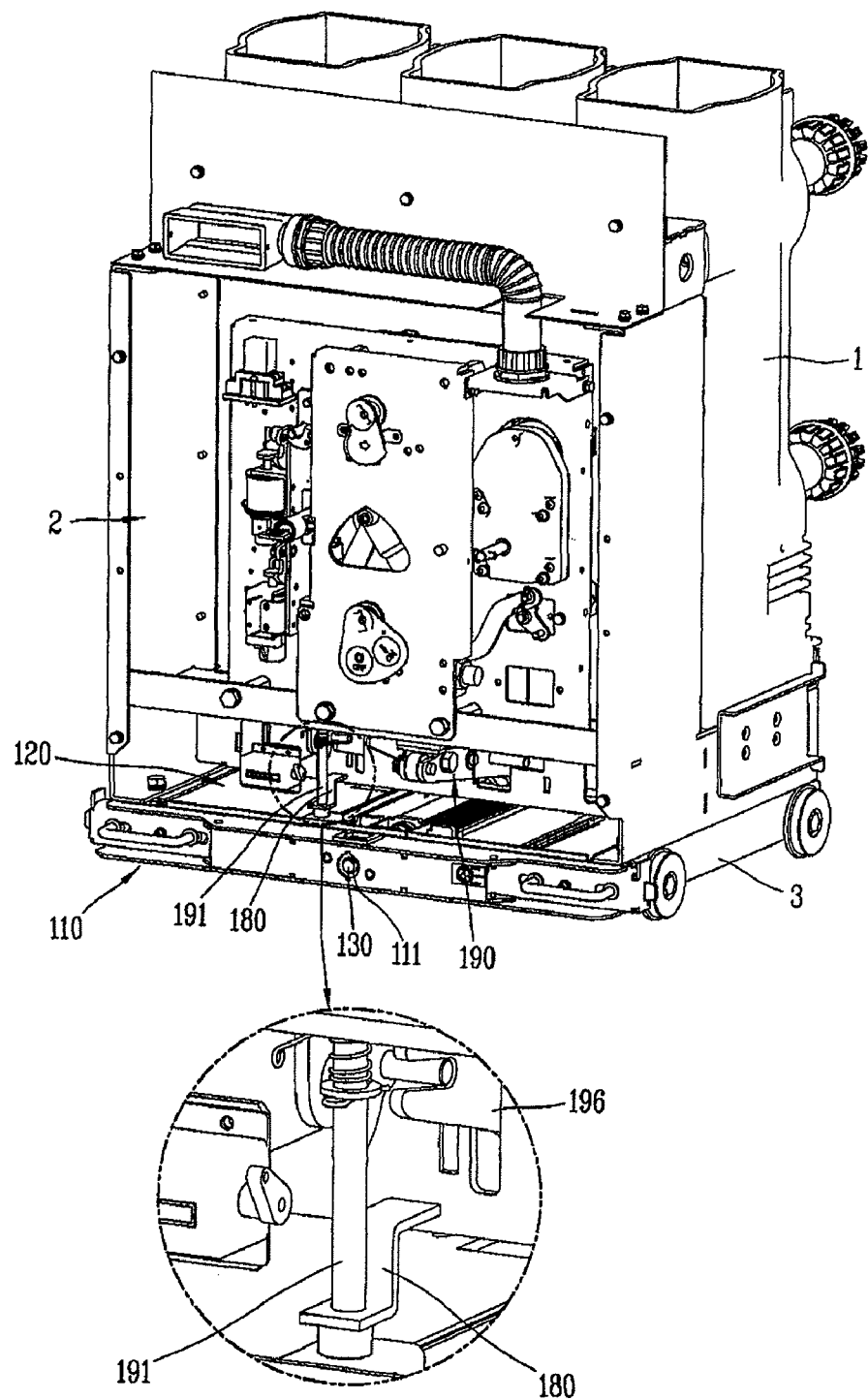
FIG. 5 is a perspective view showing a circuit breaker without a front cover according to an exemplary embodiment of the present invention.
Figure 6:
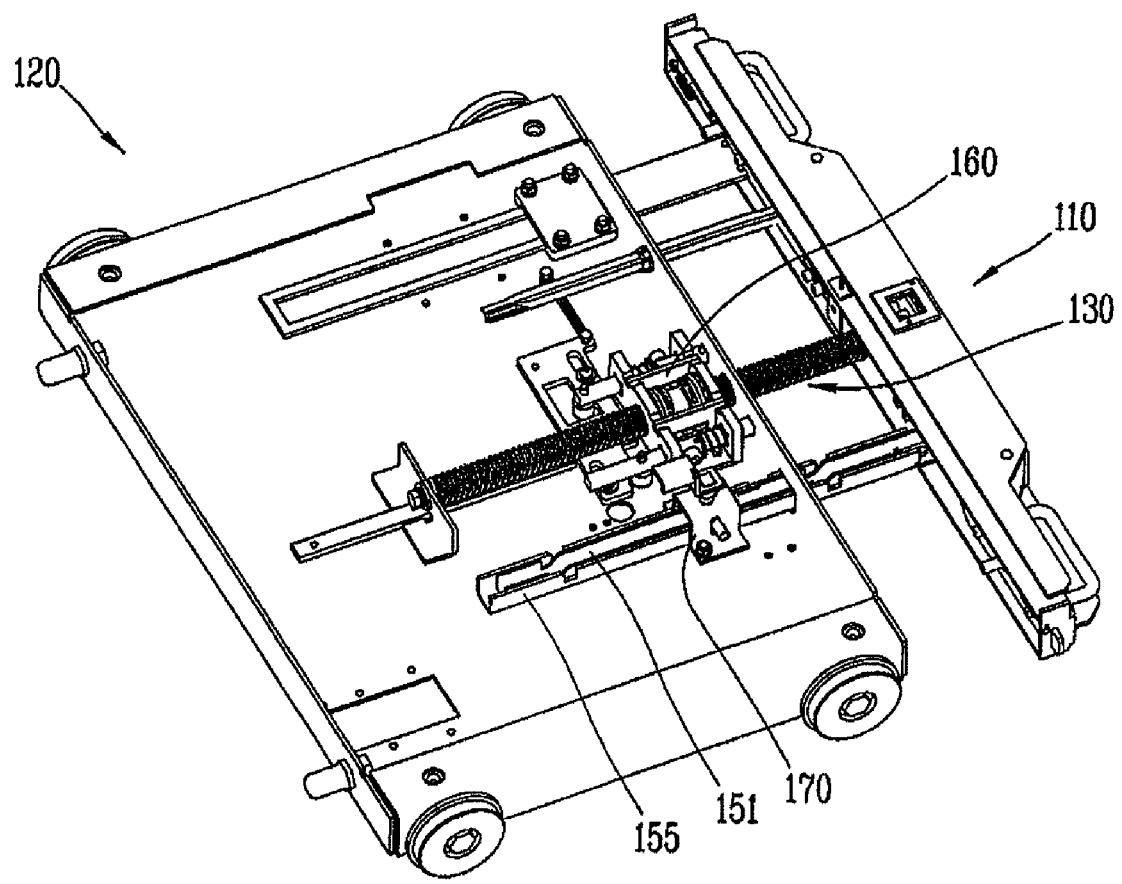
FIG. 6 is a perspective view of a carriage of the circuit breaker illustrated in FIG. 5.
Figure 7:
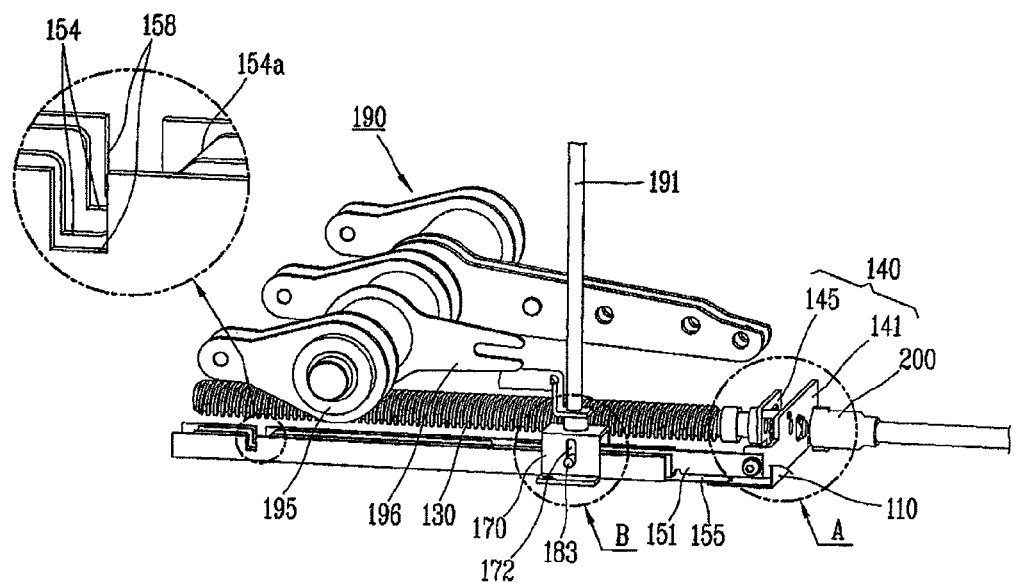
FIG. 7 is a perspective view of a major part of an apparatus for preventing withdrawing and inserting of the carriage illustrated in FIG. 6.
Figure 8:
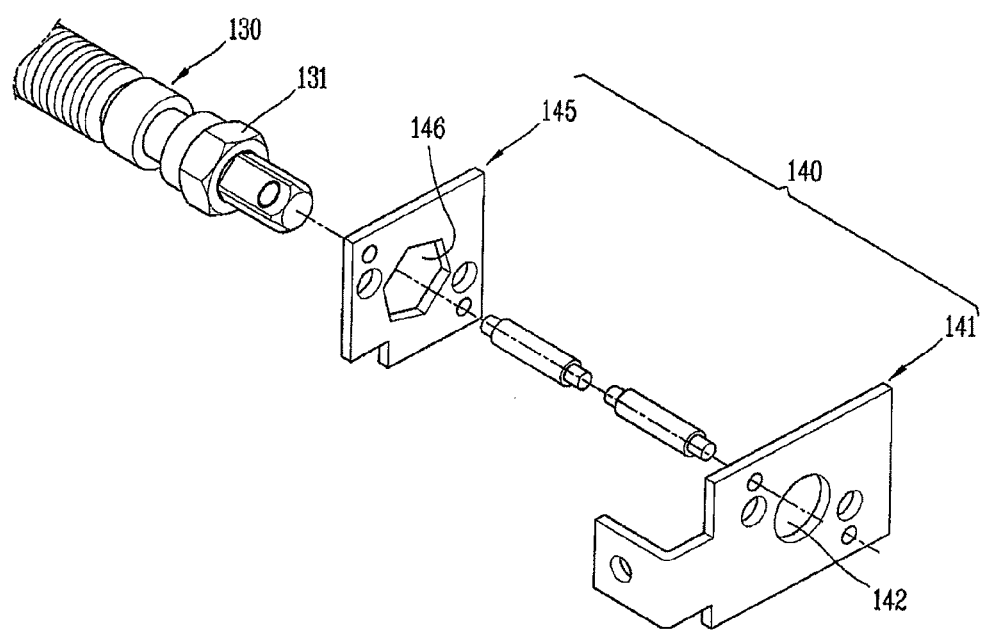
FIG. 8 is an exploded perspective view of a portion 'A' in FIG. 7.

FIG. 5 is a perspective view showing a circuit breaker without a front cover according to an exemplary embodiment of the present invention, FIG. 6 is a perspective view of a carriage of the circuit breaker illustrated in FIG. 5, FIG. 7 is a perspective view of a major part of an apparatus for preventing withdrawing and inserting of the carriage illustrated in FIG. 6, and FIG. 8 is an exploded perspective view of a portion 'A' in FIG. 7.

As shown in FIG. 5, the circuit breaker having an apparatus for preventing withdrawing and inserting of a carriage according to an exemplary embodiment of the present invention is received in a cradle 1 of a distributing board in which various electric devices including a circuit breaker are disposed and managed to operate or control a power station and a transformer substation or operate an electromotor, and the like. Specifically, a main body 2 of the circuit breaker is detachably received in the cradle 1. A plurality of terminal assemblies (without reference numerals), namely, a main line terminal assembly and a load terminal assembly, provided in the main body 2 of the circuit breaker are in contact with a plurality of terminals (not shown), namely, a main line terminal and a terminal provided in the cradle, to receive voltage and current so as to be operated. The main body 2 of the circuit breaker 2 is selectively connected with the cradle 1 when the carriage 3 on which the main body 2 of the circuit breaker is mounted is moved.

As shown in FIG. 6, the carriage 3 includes a girder part 110 coupled to a lower end portion of the cradle 1 and constituting a fixed body, and a carriage main body part 120 forming a moving body such that the space between the carriage main body part 120 and the girder part 110 can vary and allowing the main body 2 of the circuit breaker to be mounted on an upper surface thereof so as to be coupled. Both ends of a lead screw 130 constituting a first guiding member to vary the space between the girder part 110 and the carriage main body part 120 are coupled between the girder part 110 and the carriage main body part 120. Namely, the carriage main body part 120 loading the main body 2 of the circuit breaker thereon is moved to become close to the girder part 110 or moved to become away from the girder part 110 according to a rotational direction of the lead screw 130.

As shown in FIGS. 6 and 7, the girder part 110 is formed to be lengthy in a horizontal direction, has a rectangular box-like shape, and is open toward the rear side, namely, toward the carriage main body part 120, and a handle hole 111 is formed at the center of a front surface thereof, exposing an end of the lead screw 130. When a withdrawal and insertion handle 200 is inserted in the lead screw 130 through the handle hole 111 and rotated, the lead screw 130 may be rotated in a forward direction or reverse direction.

A block assembly 140 is installed within the girder part 110 in order to allow the withdrawal and insertion handle 200 to be selectively inserted to be coupled with the lead screw 130 according to a closing operation of the main body 2 of the circuit breaker, for example, in order to forcibly constrain a rotational operation of the lead screw 130 when the main body 2 of the circuit breaker is being closed.

As shown in FIGS. 6 to 8, the block assembly 140 includes a first block plate 141 and a second block plate 145 disposed to be parallel with a front side of the girder part 110. The first block plate 141 includes a through hole 142 formed substantially in a straight line with the handle hole 111 of the girder part 110, and the second block plate 145 includes a rotation prevention hole 146 having an angular shape corresponding to a rotation prevention protrusion 131 provided at a front side of the lead screw 130 and communicating with the through hole 142 of the first block plate 141.

A first push racking plate 151 constituting a portion of a constraining unit for preventing the main body 2 of the circuit breaker from being withdrawn from or inserted into the cradle 1 is integrally coupled with one end of the first block plate 141. One end of the first push racking plate 151 is coupled with the girder part 110. The first push racking plate 151 is coupled in an overlap manner with a second push racking plate 155 constituting another portion of the constraining unit such that they slide each other. Namely, the first and second push racking plates 151 and 155 are slidably coupled with respect to the carriage main body part 120, and also the first and second push racking plates 151 and 155 are coupled such that they slide each other. The first and second push racking plates 151 and 155 are slidably inserted into a through hole (no reference numeral given) provided at the front side of the carriage main body part 120.

As shown in FIGS. 6 to 9, the first push racking plate 151 is formed to have a concave sectional shape and includes a plurality of rail faces 151 allowing a racking control pin 183 to slide thereon. A pin stopping recesses 153 and 154 are formed at certain intervals at the middle portion of the plurality of rail faces 152, to allow the racking control pin 183 is inserted and limited in its sliding operation. Namely, the first pin stopping recess 153 formed at a position closed to the girder part side is a recess for maintaining a state in which the main body 2 of the circuit breaker is completely drawn out, and the second pin stopping recess 154 formed at a position near the cradle 1 is a recess for maintaining a state in which the main body 2 of the circuit breaker is completely inserted.

The second push racking plate 155 is formed to be substantially same as the first push racking plate 151. In this case, preferably, the second push racking plate 155 has a width larger than that of the first push racking plate 151 so that the first push racking plate 151 can be inserted in the second push racking plate 155 and the two push racking plates 151 and 155 can make a sliding operation with each other.

Also, the pin stopping recesses 157 and 158 formed on rail faces 156 of the second push racking plate 155 may be formed to be different from the pin stopping recesses 153 and 154 of the first push racking plate 151. Namely, the pin stopping recesses 153 and 154 of the first push racking plate 151 are includes slope faces 153a and 154a formed to be inclined in a direction that the block assembly 140 is pushed away to allow the racking control pin 183 insertedly positioned in the pin stopping recesses 153 and 154 of the first push racking plate to be released from the pin stopping recesses 153 and 154 when the block assembly 140 is pushed away by the withdrawal and insertion handle 200. Meanwhile, the pin stopping recesses 157 and 158 of the second push racking plate 155 may only need to allow the racking control pin 183 to be inserted therein, so they may have a simple square shape. Of course, the both push racking plates may be formed in an opposite manner or the both pin stopping recesses may have slope spaces.

One or more guiding bars (no reference numeral given) may be additionally coupled at the other side of the block assembly 140, namely, at the opposite side of the push racking plates 151 and 155 based on the lead screw 130 in order to stably move the carriage main body part 120.

As shown in FIG. 6, the carriage main body part 120 has a square box-like shape with an upper portion open, and wheels are installed at both sides thereof to allow the carriage main body part 120 to be smoothly moved. Through holes are formed on a front surface of the carriage main body part 120, through which the lead screw 130, the push racking plates 151 and 155, and at least one guiding bar (no reference numeral given) pass.

A nut assembly 160 is installed at the middle of a movement direction of the carriage main body part 120 and fixed to the carriage main body part 120, and engaged with the lead screw 130 to allow the carriage main body part 120 to be moved when the lead screw 130 is rotated. A racking interlock supporter 170 is installed at one side of the nut assembly 160, namely, in the vicinity of the push racking plates 151 and 155 and has a convex sectional shape to traverse and cover the push racking plates 151 and 155.

As shown in FIGS. 6 and 7, the racking interlock supporter 170 includes a first through hole 171 coupled to allow the racking interlock pin 180 to move up and down and second through holes 172 formed at both sides. The racking control pin 180 is horizontally inserted into the second through holes 172 so as to be fixed with respect to a lengthwise direction of the push racking plates 151 and 155. The first through hole 171 has a substantially same shape and size as those of a pin unit 181 of the racking interlock pin 180 (to be described), while the second through holes 172 are formed as a long hole in a vertical direction to allow the racking control pin 183 to move up and down therein.

Figure 9:
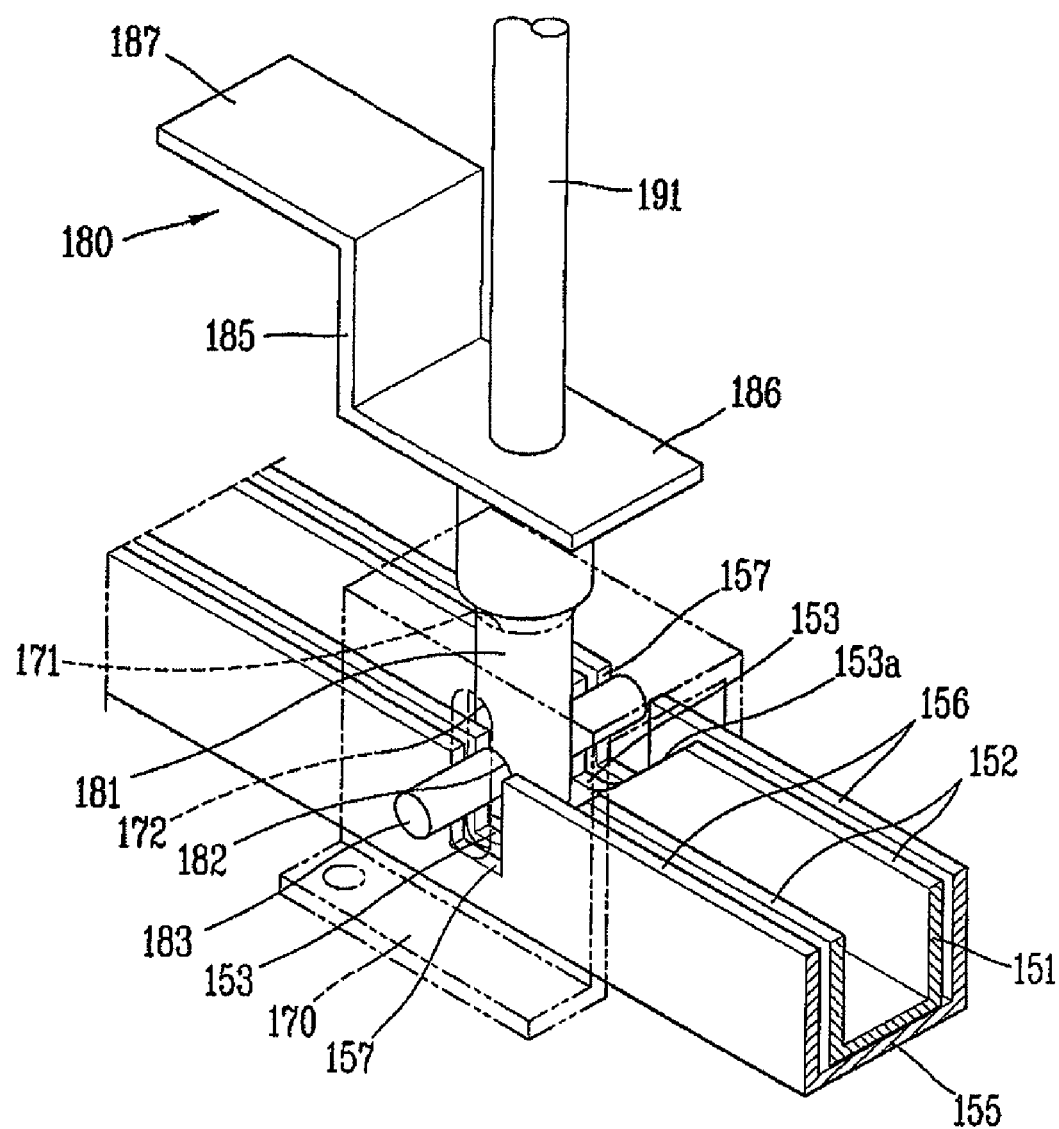
FIG. 9 is an enlarged perspective view of a portion 'B' in FIG. 7.

As shown in FIGS. 7 and 9, the racking interlock pin 180 includes the pin unit 181 slidably inserted in the first through hole 171 of the racking interlock supporter 70 as mentioned above, and a bracket unit 185 integrally coupled at an upper end of the pin unit 181 and allow an interlock bar 191 extending from an interlocking unit 190 provided at the main body 2 of the circuit breaker to be mounted thereon.

The pin unit 181 includes a pin hole 182 formed at a lower end thereof to allow the racking control pin 183 to be coupled therein in a horizontal direction. The bracket unit 185 is formed to be bent in a step-like shape. The pin unit 181 is integrally coupled with a lower surface of a first stage 186 constituting a lower end of the bracket unit 185, and a lower end of the interlock bar 191 is mounted on and in contact with an upper surface of the first stage 186.

As an upper surface of a second stage 187 constituting an upper end of the bracket unit 185 is detachably attached to an opening and closing shaft interlock lever 196 of an opening and closing shaft assembly 195 interworking in the interlocking unit 190, an ascending and descending movement is selectively limited. Namely, when the interlock bar 191 is lifted by the racking interlock pin 180, the interlocking unit 190 including the interlock bar 191 operates cooperatively so as to be in an interlock state, preventing closing of the main body 2 of the circuit breaker.

At the same time, the opening and closing shaft interlock lever 196 of the open and closing shaft assembly 195 interworking in the interlocking unit 190 is rotated downwardly, namely, toward the bracket unit 185 of the racking interlock pin 180 to limit a movement of the racking interlock pin 180 such that it is caught by the opening and closing shaft interlock lever 196 so as not to be lifted.

Here, the bracket unit 185 and the racking interlock pin 180 are tightly attached with the interlock bar 191, and they may be integrally coupled according to circumstances.

In the circuit breaker according to an exemplary embodiment of the present invention, a process in which an operator moves the main body of the circuit breaker toward the cradle (i.e., an inserting process) in a state that the main body of the circuit breaker is withdrawn from the cradle, namely in a state that the carriage main body part is tightly attached to the girder part is as follows.

Figure 10:
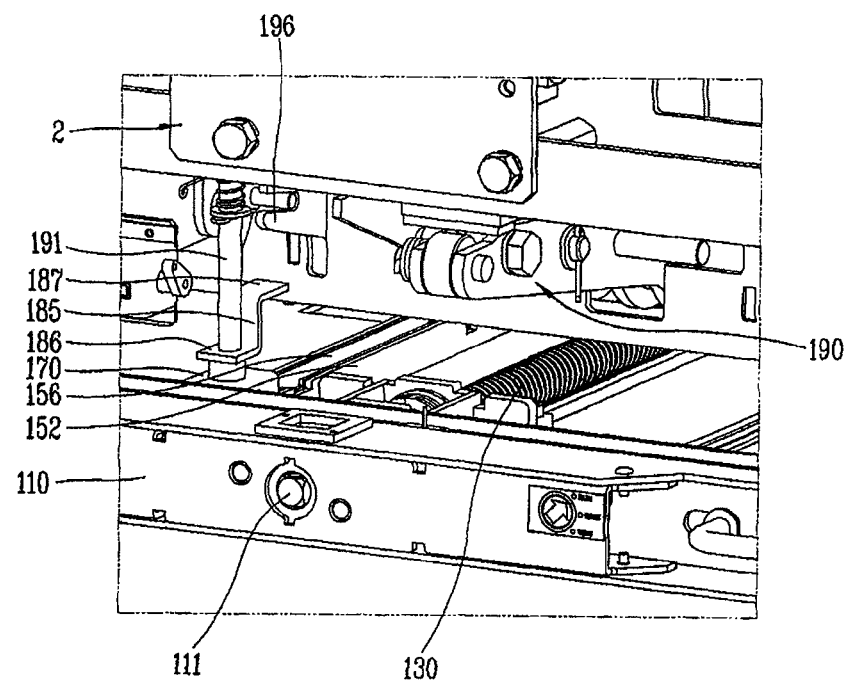
Figure 11:
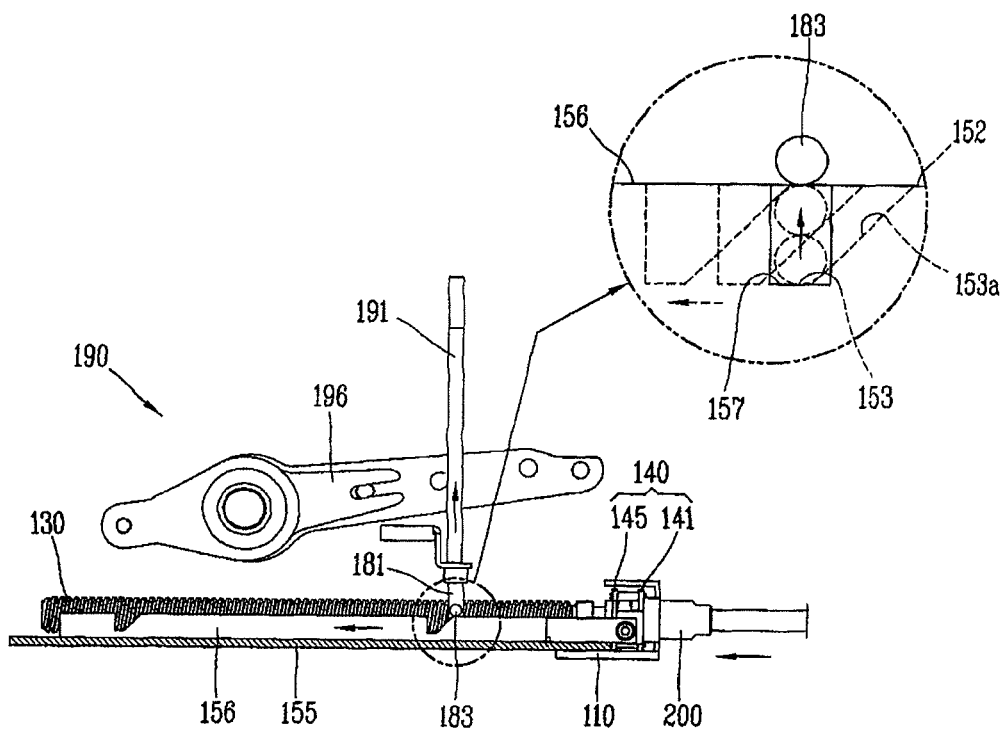
Figure 12:
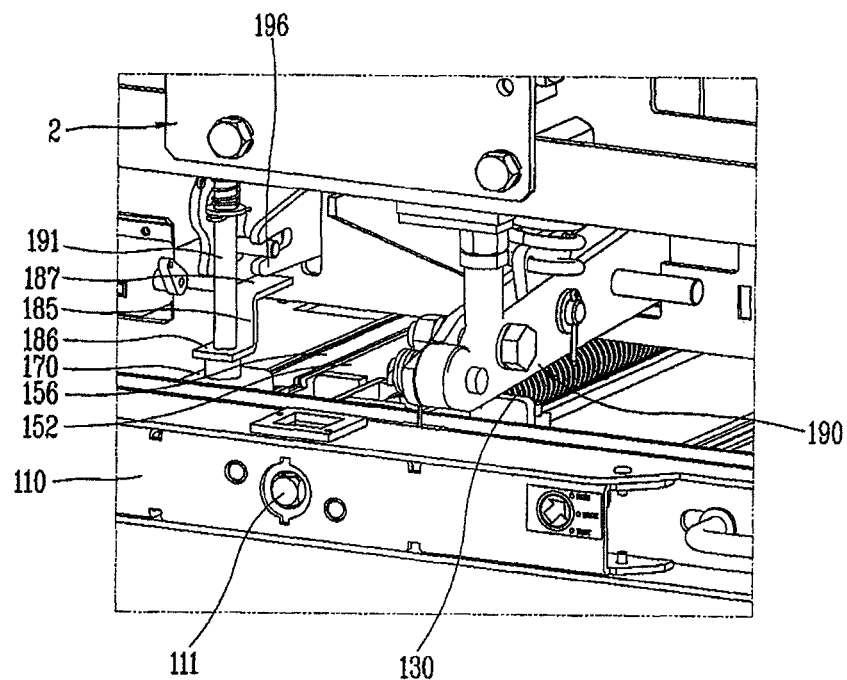
Figure 13:
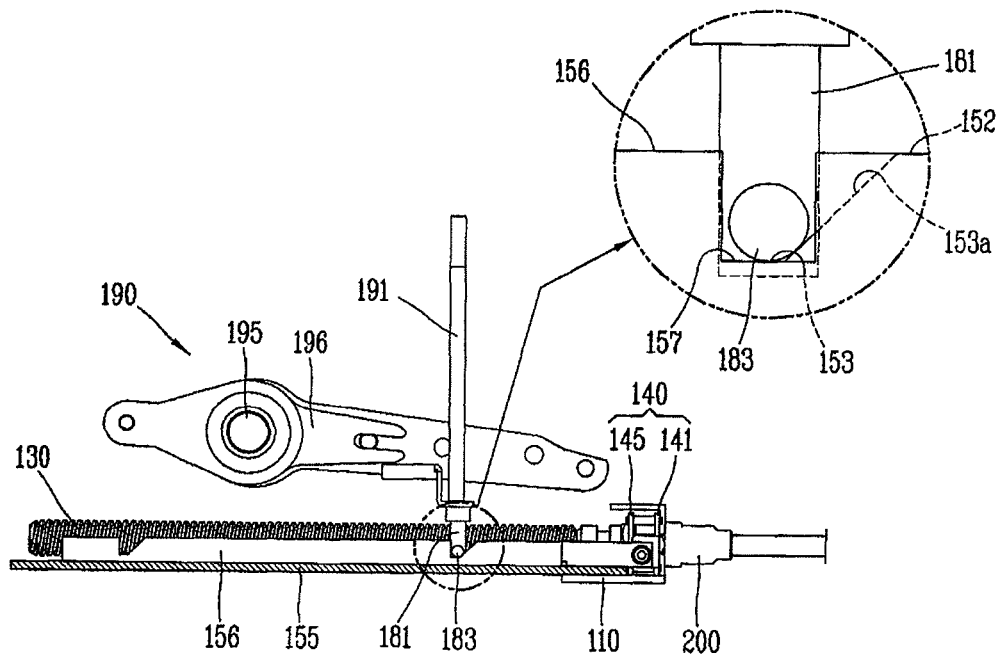

Namely, in a state that the main body 2 of the circuit breaker is withdrawn from the cradle, in order to move the main body 2 of the circuit breaker to an inserted position, the operator must push the carriage main body part 120 toward the cradle 1 from the girder part 110 by using the withdrawal and insertion handle 200. To this end, as shown in FIGS. 10 and 11, the block assembly 140 is slightly pushed toward the cradle, namely, backward, and the first push racking plate 151 coupled with the block assembly 140 is also pushed backward. Then, the first push racking plate 151 makes a relative sliding operation with respect to the second push racking plate 155 and the position of the first pin stopping recess 153 of the first push racking plate 151 is changed with respect to the first pin stopping recess 157 of the second push racking plate 155, and accordingly, the racking control pin 183 ascends along the slope face 153a of the first pin stopping recess 153 provided at the first push racking plate 151. As the racking control pin 183 ascends, the pin unit 181 of the racking interlock pin 180 ascends along the first through hole 171 of the racking interlock supporter 170. Then, the bracket unit 185 of the racking interlock pin 180 pushes up the interlock bar 191. As the interlock bar 191 is pushed up, the interlocking unit 190 provided at the main body 2 of the circuit breaker operates the interlocking unit 190 to prevent a closing operation of the circuit breaker.

Here, the racking control pin 183 which has been ascending along the slope face 153 of the first pin stopping recess 153 of the first push racking plate 151 is released from the first pin stopping recesses 153 and 157 of the respective push racking plates 151 and 155 and then mounted on the rail faces 152 and 156 of the respective push racking plates 151 and 155 when the both first pin stopping recesses 153 and 157 cross each other. Then, the racking control pin, namely, the racking interlock pin 180, is in a state of slidably moving on the rain faces 152 and 156 of the respective push racking plates 151 and 155 while maintaining a position at which it has pushed up the interlock bar 191, namely, the interlock position at which closing is interrupted by the interlocking unit 190.

At this time, when the operator pushes the withdrawal and insertion handle 200 into the handle hole 111 of the girder part 110, the block assembly 140 is pushed backward by the withdrawal and insertion handle 200, and the rotation prevention protrusion 131 provided at the read screw 130 is then released from the rotation prevention hole 146 provided on the second block plate 145 of the block assembly 140. Accordingly, the withdrawal and insertion handle 200 and the lead screw 130 are coupled, so the lead screw 130 can be rotated.

When the operator rotates the withdrawal and insertion handle 200, the carriage main body part 120 is pushed toward the cradle 1 by the nut assembly 160 coupled with the lead screw 130. And when the racking control pin 183 is inserted in the second pin stopping recesses 154 and 158 of the respective push racking plates 151 and 155, the inserting operation is completed.

Meanwhile, while the main body of the circuit breaker 2 is being closed, even if the operator attempts to rotate the lead screw 130 by using the withdrawal and insertion handle 200, the block assembly 140 is not pushed to the rear side. Thus, because the rotation prevention protrusion 131 of the lead screw 130 is inserted in the rotation prevention hole 146 of the block assembly 140, the lead screw 130 cannot be rotated. Therefore, while the main body 2 of the circuit breaker is being closed, the main body 2 of the circuit breaker is not withdrawn from the cradle 1

Namely, in insertion process as described above, while the closing of the main body 2 of the circuit breaker is being prevented, the opening and closing interlock lever 196 of the opening and closing shaft assembly 195, a part of the interlocking unit 190, is rotated clockwise as shown in FIGS. 10 to 13. Then, the end of the opening and closing interlock lever 196 descends to constrain the bracket unit 185 of the racking interlock pin 180 as shown in FIGS. 10 to 13. Then, the racking interlock pin 180 cannot ascend any longer, preventing the racking control pin 183 from being released from the first pin stopping recesses 153 and 157. Then, even if the block assembly 140 is pressed toward the withdrawal and insertion handle 200, the block assembly 140 will not be pushed backward (to the rear side), preventing the withdrawal and insertion handle 200 from being coupled with the lead screw 130, and thus, the lead screw 130 cannot be rotated.

In this manner, while the carriage main body part is in the inserted state, namely, when the main body of the circuit breaker is being closed, the withdrawal and insertion handle is prevented from being coupled with the lead screw. Thus, unnecessary withdrawing and inserting of the carriage can be fundamentally prevented while the circuit breaker is being closed, and thus, various safety accidents, a contact resistance, a temperature increase, and damage to a device resulting from breakdown can be prevented.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus for preventing withdrawing and inserting of a carriage of a circuit breaker, the apparatus comprising:
a first guiding member having both ends coupled with a girder part, a fixed body, and a carriage main body part, a moving body to which a circuit breaker main body is coupled, respectively, and allowing the distance between the girder part and the carriage main body part to be varied according to its rotational direction;
a second guiding member provided at the girder part and selectively limiting the rotational movement of the first guiding member according to whether or not an external force additionally applied from the exterior; and
a constraining unit configured to constrain a movement of the second guiding member although an external force is additionally applied to the second guiding member while a closing operation is performed at the circuit breaker main body, to thereby prevent the circuit breaker main body from being withdrawn from a cradle accommodating the circuit breaker main body.

2. The apparatus of claim 1, wherein the circuit breaker main body comprises an interlocking unit for limiting the closing operation of circuit breaker.

3. The apparatus of claim 2, wherein the constraining unit interworks with the interlock unit to limit a movement of the second guiding member during the closing operation of the circuit breaker.

4. The apparatus of claim 3, wherein, until when the circuit breaker main body is electrically connected with the cradle, the constraining unit operated by the second guiding member operates the interlocking unit to limit the closing operation of the circuit breaker.

5. An apparatus for preventing withdrawing and inserting of a carriage of a circuit breaker, the apparatus comprising:
a lead screw having both ends rotatably coupled with a girder part, a fixed body, and a carriage main body part, a moving body to which a circuit breaker main body is coupled, respectively, and an intermediate part between the both ends being threaded with the circuit breaker main body;
a block assembly coupled to a lead screw at the girder part side and moving in a lengthwise direction of the lead screw by a withdrawal and insertion handle applying an additional external force from the exterior;
is a push racking plate disposed to be parallel to the lead screw and installed to be movable in a lengthwise direction of the lead screw with respect to the carriage main body part; and
a racking interlock pin installed at the carriage main body part such that it is movable in a direction perpendicular to a direction in which the push racking plate is moved, and coupled with the carriage main body part such that an ascending and descending movement is limited by an interlocking unit that limits a closing operation of the circuit breaker.

6. The apparatus of claim 5, wherein a rotation prevention protrusion is formed at one end of the lead screw and has an angular outer circumferential surface.

7. The apparatus of claim 6, wherein the block assembly includes a rotation prevention hole which is to be selectively engaged with the rotation prevention protrusion, and an inner circumferential surface of the rotation prevention hole is formed to be angular to correspond to the rotation prevention protrusion.

8. The apparatus of claim 5, wherein the push racking plate comprises a rail face formed to be parallel in a lengthwise direction of the lead screw to allow the racking interlock pin to slide thereon.

9. The apparatus of claim 8, wherein a recess is formed at a middle portion of the rail face in the lengthwise direction to allow the racking interlock pin to be inserted therein to generate a height difference.

10. The apparatus of claim 9, wherein the recess has a slope face allowing the racking interlock pin to slide thereon.

11. The apparatus of claim 5, wherein the push racking plate comprises a first push racking plate and a second push racking plate slidably coupled with the first push racking plate, the first push racking plate is fixed to the block assembly, and the second push racking plate is fixed to the girder part.

12. The apparatus of claim 11, wherein a recess is formed at the first push racking plate to allow the racking interlock pin to be inserted therein to generate a height difference and the recess has a slope face allowing the racking interlock pin to slide thereon.

13. The apparatus of claim 5, wherein the racking interlock pin comprises:
   a pin unit coupled to slid on the push racking plate; and
   a bracket unit integrally coupled with the pin unit to push up an interlock bar to allow the interlocking unit to prevent a closing operation of the interlocking unit, constrained by an opening and closing side interlock lever operating as the closing operation is prevented by the interlocking unit, and having a flat shape.

14. The apparatus of claim 13, wherein the racking interlock pin is coupled at a racking interlock supporter coupled with the carriage main body part such that the pin unit slides in a movement direction of the interlock bar.

* * * * *